May 16, 1967
R. GOODMAN
3,319,481
ADJUSTABLE DEVICE FOR TRANSLATING ROTARY
MOTION INTO LINEAR MOTION
Filed May 24, 1965
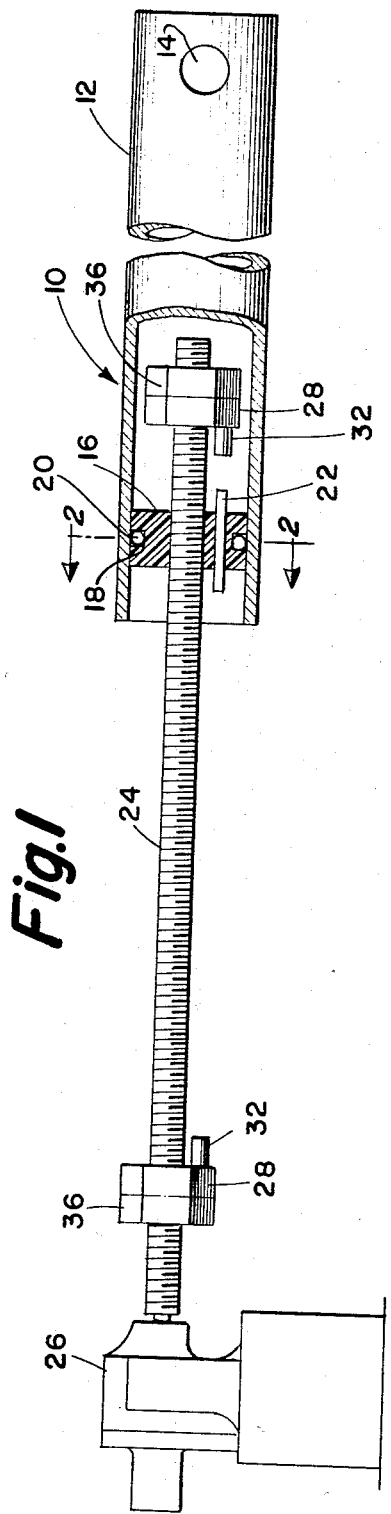
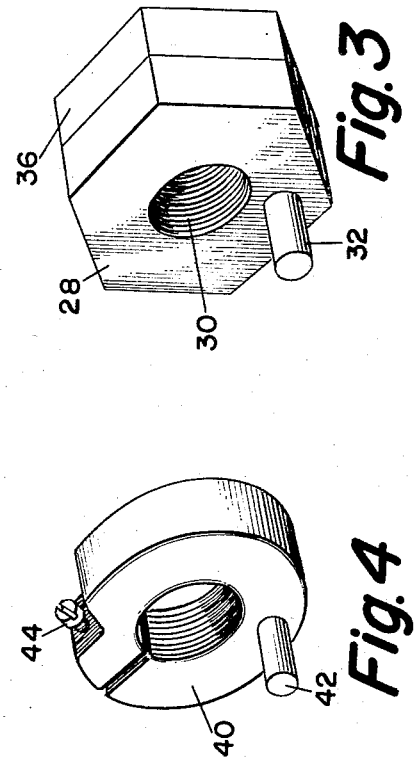
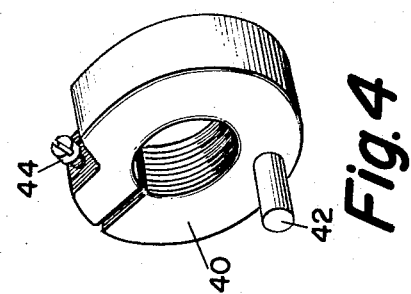
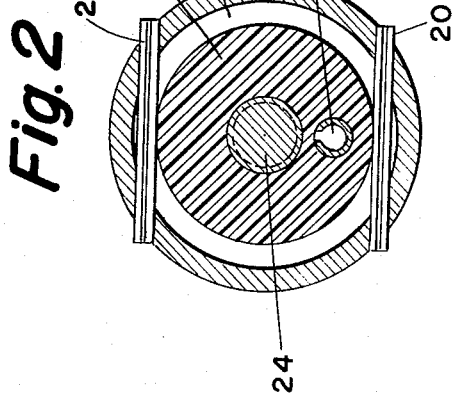
INVENTOR.
ROBERT GOODMAN
BY
*Arthur Jacobs*
ATTORNEY United States Patent Office 3,319,481
Patented May 16, 1967

3,319,481
ADJUSTABLE DEVICE FOR TRANSLATING ROTARY MOTION INTO LINEAR MOTION
Robert Goodman, 5325 Westminster Ave., Philadelphia, Pa. 19131
Filed May 24, 1965, Ser. No. 458,041
5 Claims. (Cl. 74—424.8)

ABSTRACT OF THE DISCLOSURE

This invention consists of a screw-threaded shaft extending through a nut that is normally frictionally held in stationary position within a tubular shaft. The threaded shaft has a collar that is adjustable longitudinally of the threaded shaft but is held in fixed position after adjustment. The collar is provided with a pin that engages a second pin on the nut when the threaded shaft has been threadedly moved a certain extent relative to the tubular shaft and its frictionally held nut. When such engagement occurs, any further rotation of the threaded shaft in the same direction overcomes the frictional engagement between the nut and the tubular shaft and causes the nut to rotate with the threaded shaft, thereby preventing any further relative longitudinal movement between the two shafts. Upon reverse rotation, there is immediate disengagement between the two pins, the nut is again frictionally held within the tubular shaft, and relative longitudinal movement between the shafts is reestablished.

---

This invention relates to a nut and screw assembly for translating rotary motion into linear motion, and it more particularly relates to an assembly of this type wherein the linear motion is automatically halted after an adjustably predetermined linear movement has been effected.

This is a continuation-in-part of applicant's co-pending application Ser. No. 385,435, filed July 27, 1964, now Patent No. 3,277,736.

The mechanism disclosed in the aforementioned continuation-in-part application comprises two shaft elements telescopically movable relative to each other to increase or decrease the total shaft length. The linear telescopic movement is effected by rotation of one of the shaft elements, comprising a threaded shaft or rod, extending through a nut frictionally retained in the hollow interior of the other shaft element which comprises a tubular shaft or rod. However, the linear motion is automatically halted upon a predetermined relative movement in either linear direction by automatic disengagement of the nut with the tube and simultaneous engagement of the nut with the threaded rod to rotate therewith. This results in a free-wheeling nut which, in turn, results in what is, in effect, a de-clutching of the threaded rod from the tube. Upon reverse rotation of the threaded rod, the free-wheeling of the nut is automatically halted and, simultaneously, the clutching is re-imposed to again permit relative linear movement.

The mechanism for effecting the above-described operation is disclosed in the aforesaid co-pending application to comprise a threaded rod rotatably actuated by a reversible motor or the like and threadedly engaged with a nut positioned in the interior of a tubular rod or shaft. The nut is constructed of a material with a very low coefficient of friction such as an acetal resin called "Delrin" (produced by Du Pont).

The outer periphery of the nut is in normal frictional engagement with the inner wall of the tube and permits the threaded rod to threadedly move therethrough. However, the threaded rod is provided with a stop means, such as a laterally-extending pin, adjacent either end. When the linear movement of the threaded rod brings the stop means into engagement with an engagement means on the nut, such as an axially-extending pin, the nut and threaded rod become releasably locked together and rotate as a unit. This rotation is sufficient to overcome the peripheral frictional engagement of the nut. The nut, as it then rotates with the threaded rod, becomes free-wheeling and, thereby, in effect, declutches the threaded rod from the tubular shaft and prevents further axial relative movement between them. Upon reverse rotation of the threaded rod, the stop means is immediately disengaged from the nut and the nut is then immediately retained in its former frictional engagement with the tube wall, whereby the two shaft elements are again linearly movable relative to each other upon rotation of the threaded rod.

The above-described mechanism, although highly effective for its purpose, is limited in its clutching and declutching movements to fixed predetermined travel of the threaded rod in either direction. It is, therefore, necessary to construct a specific device or size thereof for each specific type of use.

It is an object of the present invention to provide adjustment means which will permit the easy and rapid adjustment of the travel of the threaded shaft to suit any particular requirements.

Another object of the present invention is to provide an adjustment means of the aforesaid type which is simple in construction and inexpensive to manufacture and install.

Other objects and many of the attendant advantages of this invention will be readily appreciated as the same becomes better understood by reference to the following description when read in conjunction with the accompanying drawings wherein:

FIG. 1 is a side view, partly in section and partly in elevation, with parts broken away, of a nut and screw assembly embodying the present invention.

FIG. 2 is a cross-sectional view taken on line 2—2 of FIG. 1.

FIG. 3 is an enlarged, detailed perspective view of the adjustable stop means shown in FIG. 1.

FIG. 4 is a view, similar to FIG. 3, of a modified form of stop means.

Referring now in greater detail to the various figures of the drawing wherein similar reference characters refer to similar parts, there is shown an assembly, generally designated 10, that comprises a hollow, tubular shaft 12 having a transverse aperture 14 at one end for holding a rivet, bolt, screws, or the like, for pivotally connecting the shaft to a member to be actuated.

Closely fitted within the tube 12 is a nut 16, preferably constructed of a self-lubricating acetal resin called "Delrin" (manufactured by Du Pont) which possesses a low coefficient of friction.

The nut 16 is of such diameter that it snugly fits within the hollow tube 12 with sufficient frictional engagement to normally prevent rotation of the nut within the tube. This frictional engagement is effected despite the low coefficient of friction of the acetal resin because of the relatively large surface area around the outer periphery of the nut as compared to the fine threads on the interior of the nut which, being also constructed of the same acetal resin, also have a low coefficient friction. However, this peripheral fricitonal engagement may be overcome when a rotational force of sufficient intensity is applied to the nut.

The nut 16 is further provided with an outer peripheral groove 18 and, extending through this groove tangentially to the nut 16, are one or more (here shown as two) roll pins 20. These roll pins 20 are shown as being oppositely disposed relative to each other, and the ends of each extend through corresponding apertures in the tube 12 (as best shown in FIG. 2), whereby they retain the nut against axial movement relative to the tube 12, and also act as supplemental frictional means for preventing rotation of the nut in the tube until overcome by the previously-mentioned rotational force. Rigidly secured in the nut 16 and extending axially thereof so that its ends project from opposite radial faces of the nut is a pin 22.

The nut 16 is provided with a threaded central opening through which extends a screw-threaded shaft or rod 24. This shaft 24 may be rotated by any desirable operating means but is herewith shown operatively connected to a reversible electrical motor 26 of standard design.

All of the above-described structure is similar to that disclosed in the aforementioned continuation-in-part application. However, in place of the lateral stop pins disclosed in that application, in the present apparatus there is provided adjacent each end of the screw-shaft 24 an adjustable stop assembly comprising a nut 28 having a threaded aperture 30 (as best shown in FIG. 3), to threadedly receive the shaft 24, and also having a pin 32 axially extending from the inner face thereof.

Each pin 32 is engageable with the corresponding end of the pin 22 extending from the nut 16 when the tubular shaft 12 is longitudinally moved to bring these pins into overlapping position. When the pins 32 and 22 are engaged, they form a connection between the shaft 24 and nut 16, upon continued rotation of the shaft, which results in rotation of the nut 16 against the friction on its outer periphery. The pins are, however, immediately disengaged upon rotation of the shaft 24 in the opposite direction.

In order to vary the longitudinal movement or "stroke" of the shaft 12 before it is declutched from the threaded shaft 24 by the free-wheeling motion of the nut 16, the pins 32 are adjustable longitudinally of the shaft 24 by threadedly moving the respective nuts 28 longitudinally of the shaft 24. Upon being moved to the desired position, a corresponding jam nut 36 is threadedly moved along the shaft 24 and is tightened against the nut 28 to hold it in place. When a new adjusted position is desired, it is merely necessary to loosen the frictional engagement between the pin-holding nut 28 and jam nut 36 by moving the nut 36 away and then moving the nut 28 to the desired position, after which the jam nut 36 is again tightened against it.

FIG. 4 shows a modified form of adjustable pin arrangement wherein instead of a threaded nut, such as shown at 28, and jam nut, such as shown at 36, there is provided a split collar in the form of a partially split nut 40 having a pin 42, similar to pin 32, projecting from one face thereof. The split nut 40 is provided with a lock-screw 44 for tightening and loosening it. In operation, when adjustment is desired, the lock-screw 44 is manipulated to loosen the nut 40, which is then moved along the shaft 24 to the desired position. The lock-screw 44 is then manipulated to tighten the nut 40 and hold it in the adjusted position.

This form of adjustment mechanism eliminates the necessity of using a jam nut and may, in some instances, be more desirable.

Although the screw shaft has been illustrated and described as being axially fixed while the nut and tubular shaft are movable axially thereof, it is within the scope of the invention to make the nut and tubular shaft fixed and the screw shaft axially movable.

Obviously, many modifications and variations of the present invention are possible in the light of the above teachings. It is, therefore, to be understood that, within the scope of the appended claims, the invention may be practiced otherwise than as specifically described.

The invention claimed is:

1. A mechanical movement device comprising a first shaft and a second shaft, said shafts being operatively connected for axial movement relative to each other, the first shaft being screw-threaded and the second shaft being held against rotation and having a clutch-nut threadedly engaged with said first shaft, said nut not being axially fixed relative to said second shaft, restraining means normally holding said nut rotationally fixed relative to said second shaft whereby relative rotation between said first shaft and said nut provides relative axial movement between said first and second shafts, restraint-overcoming means on said first shaft for overcoming said restraining means upon predetermined axial movement of said shafts relative to each other, the overcoming of said restraining means causing said nut to rotate with said first shaft relative to said second shaft to discontinue relative axial movements of said shafts, adjustment means for adjusting said restraint-overcoming means longitudinally of said first shaft, and releasable lock means for locking said adjustment means in adjusted positions longitudinally of said first shaft.

2. The device of claim 1 wherein said restraint-overcoming means is a pin mounted on a pin-carrying nut, said pin-carrying nut constituting said adjustment means and being in threaded engagement with said first shaft, and said lock means being a jam nut in threaded engagement with said first shaft and threadedly movable on said first shaft into and out of frictional engagement with said pin-carrying nut, said pin being rotatably engageable and disengageable with a pin on said clutch-nut.

3. The device of claim 2 wherein said pin on said pin-carrying nut extends in a parallel plane to said first shaft, the pin on the clutch-nut also extending in a parallel plane to said first shaft and being engageable by and releasable from said pin on said pin-carrying nut upon rotational movement of said pin-carrying nut.

4. The device of claim 1 wherein said restraint-overcoming means is a pin mounted on a split collar, said split collar having a lock-screw to tighten and loosen the collar by moving its split portions toward and away from each other, said split collar constituting said adjustment means and said lock-screw constituting said lock means.

5. The device of claim 1 wherein there is a restraint-overcoming means, an adjustment means and a lock means on each side of said clutch-nut.

No references cited.

DAVID J. WILLIAMOWSKY, *Primary Examiner.*

L. H. GERIN, *Assistant Examiner.*